United States Patent [19]
Batson

[11] Patent Number: 5,844,327
[45] Date of Patent: Dec. 1, 1998

[54] APPARATUS AND METHOD FOR OPTIMIZING POWER DISTRIBUTED IN A BROADBAND SIGNAL SYSTEM

[75] Inventor: John Gary Batson, Duluth, Ga.

[73] Assignee: Antec Corporation, Norcross, Ga.

[21] Appl. No.: 802,026

[22] Filed: Feb. 18, 1997

Related U.S. Application Data

[60] Provisional application No. 60/024,248 Aug. 21, 1996.

[51] Int. Cl.$^6$ .................................................... H02J 7/00
[52] U.S. Cl. .............................. 307/64; 307/80; 307/23; 340/310.01
[58] Field of Search ................................. 307/64, 65, 66, 307/80, 11, 18, 19, 22, 21, 23, 29; 340/310.01, 310.02, 310.03, 310.04, 310.05, 310.06, 310.07, 310.08

[56] References Cited

U.S. PATENT DOCUMENTS

| | | | |
|---|---|---|---|
| 3,909,560 | 9/1975 | Martin et al. | 179/170 J |
| 5,332,927 | 7/1994 | Paul et al. | 307/66 |
| 5,410,720 | 4/1995 | Osterman | 455/33 |
| 5,436,822 | 7/1995 | West | 363/63 |
| 5,467,384 | 11/1995 | Skinner | 379/66 |
| 5,477,091 | 12/1995 | Fiorina et al. | 307/66 |
| 5,483,108 | 1/1996 | Girard et al. | 307/64 |
| 5,592,030 | 1/1997 | Adahan | 307/80 |
| 5,642,002 | 6/1997 | Mekanik et al. | 307/64 |

FOREIGN PATENT DOCUMENTS

| | | |
|---|---|---|
| 2491704 | 10/1980 | France . |
| 2288891 | 1/1995 | United Kingdom . |
| 90/07235 | 6/1990 | WIPO . |

*Primary Examiner*—Richard T. Elms
*Assistant Examiner*—Jonathan Kaplan

[57] ABSTRACT

A broadband system that simultaneously delivers output power and supplies a broadband signal and has a redundant bus power supply. The system includes a central office having a video gateway. The system further includes a plurality of nodes having a power supply and a combiner for coupling the broadband signal to the power supply output. At each node, a distribution line delivers broadcast services and power to a consumer site. The power supply comprises a battery source, rectifier, filter, inverter and generator to provide a secondary DC power source. The various elements of the power supply are diode isolated and are interconnected via a redundant power bus, thus allowing power to be maintained to the subscribers even in case of failure of one or more elements of the power supply. The power supply further includes a plurality of inverters, each inverter supplies power to a distribution line. A controller monitors the status of each inverter and secondary power source. In addition, the controller monitors output power supplied by each inverter. The controller exchanges control and status information with the power supply and secondary power source through a memory array. By issuing control data to the power supply, the controller compensates for a detected loss of power supplied to each distribution line. The controller transmits status information to the central office.

32 Claims, 12 Drawing Sheets

| HEXADECIMAL INDEX (82) | REGISTER DESCRIPTION (84) | CONTROLLER READ/WRITE ACCESS RIGHTS (86) | MEMORY STORAGE TYPE (88) |
|---|---|---|---|
| 00 | COMMUNICATION ERROR | R/W | VOLATILE |
| 01 | CRITICAL STATUS | R | VOLATILE |
| 02 – 07 | STATUS | R | VOLATILE |
| 08 – 0F | CONTROL | R/W | VOLATILE |
| 10 – 7F | PARAMETRIC MEASUREMENTS | R | VOLATILE |
| 80 – 8F | RESERVED | R | NONVOLATILE |
| 90 – AF | CALIBRATION FACTORS | R | NONVOLATILE |
| B0 – BF | CALIBRATED PARAMETRIC SETTING | R/W | NONVOLATILE |
| C0 – FF | UNCALIBRATED PARAMETRIC SETTING | R/W | NONVOLATILE |

*FIG. 6*

APPARATUS AND METHOD FOR OPTIMIZING POWER DISTRIBUTED IN A BROADBAND SIGNAL SYSTEM

BENEFIT OF EARLIER PROVISIONAL APPLICATION & CROSS-REFERENCE

This application claims the benefit of U.S. Provisional application Ser. No. 60/024,248 filed Aug. 21, 1996. This application is related to copending application filed concurrently herewith, LOW-NOISE, HIGH RMS SWITCHING POWER SUPPLY FOR BROADBAND SIGNAL DISTRIBUTION SYSTEM, assigned to the assignee of the present patent application. The copending application is incorporated herein by this reference.

BACKGROUND OF THE INVENTION

The present invention relates to a broadband signal system and more particularly to an apparatus and method for optimizing power distributed in a broadband signal system.

In a typical broadband system, such as a CATV system, there is a head-end that supplies broadband signals over a distribution network to a plurality of consumers at remote sites. The head-end typically receives or generates broadband signals and provides them to distribution nodes over one or more trunk lines. From the distribution nodes, the broadband signals are typically distributed over coaxial cables known as feeder lines to a termination node. Between the distribution and termination nodes, consumers 'tap' a feeder line to receive the broadband signals at a remote site.

CATV operators control the access to the system through network interface units (NIUs). The NIUs are typically located on the outside of a consumer's home so they may be readily accessible by the CATV system service personnel.

Rather than rely on power from a consumer's circuit, CATV operators prefer to supply electrical power to the NIUs through the same coaxial cable that provides the broadband signal. However, if the NIUs experience a loss of power, the consumer cannot remedy the problem by resetting a circuit breaker or calling the local electric utility company. Instead, the consumer must contact the CATV operator and a service representative must visit the consumer site to trace the cause of a power loss. This increases the number of unscheduled maintenance calls. Because the service representative must visit the site to learn the full extent of problem attributing to the power loss, a long period of time is required for troubleshooting a power loss. Therefore, it is essential that the power supplied by the CATV operators be highly reliable, and that field failures in the power distribution or power supplies be infrequent, easy to locate, fast to repair and have minimal or no impact on the consumers.

Thus, it is an object of the subject invention to provide a reliable power source in a CATV system;

It is further an object of this invention to provide a redundant bus power source capable of providing power even in the event of partial failure of, or maintenance to the power supply;

It is further an object of the subject invention to continuously monitor the power supply status;

It is further an object of the subject invention to provide power supply status information to the CATV operator; and It is still further an object of the subject invention to compensate for a loss or drop of power without the need for intervention by a service representative.

SUMMARY OF THE INVENTION

The present invention is directed to a broadband system comprising a plurality of nodes coupled to the broadband system for receipt of a broadband signal. Each node comprises a power supply having a plurality of power outlets to supply power to a plurality of distribution lines coupled to said node, and a combiner for coupling the broadband signal to each power outlet for each distribution line. The power supply further comprises a controller for monitoring a plurality of status elements in a broadband system to control said broadband system and to detect system operation errors.

The present invention is further directed at a redundant bus switched (RBST) power supply, in which the main power (Mains), back-up batteries and auxiliary power units are diode isolated from each other and connected to the output via redundant power bus; thus providing for a power supply capable of continuous operation even during the failure, removal and/or maintenance of the rectifier or the DC auxiliary source. Said RBST power supply also dispenses with the need to float charge the batteries, allowing the use of various charging regimens which may be more beneficial to the batteries and extends their life.

The present invention is further directed to a method for optimizing power distributed in a broadband system comprising a plurality of nodes coupled to the broadband system for receipt of a broadband signal. Each node comprises a power supply having a plurality of power outlets to supply power to a plurality of distribution lines coupled to the node, and a combiner for coupling said broadband signal to each power outlet for each distribution line. The method comprises the steps of monitoring a plurality of status elements in the node, detecting critical changes in the status elements which indicate a reduction of power supplied to at least one of the distribution lines, identifying the source of the critical change, modifying operation parameters of the critical change source so that power supplied to the distribution line returns to a normal operating level, and transmitting the status elements to the broadband system.

BRIEF DESCRIPTION OF THE DRAWINGS

The objects and advantages of the present invention will become apparent from the following description of the accompanying drawings. It is to be understood that the drawings are to be used for illustration only, and not as a definition of the invention.

In the drawings:

FIG. 6 is a map of the memory device;

DESCRIPTION OF THE PREFERRED EMBODIMENT

Figure 1:
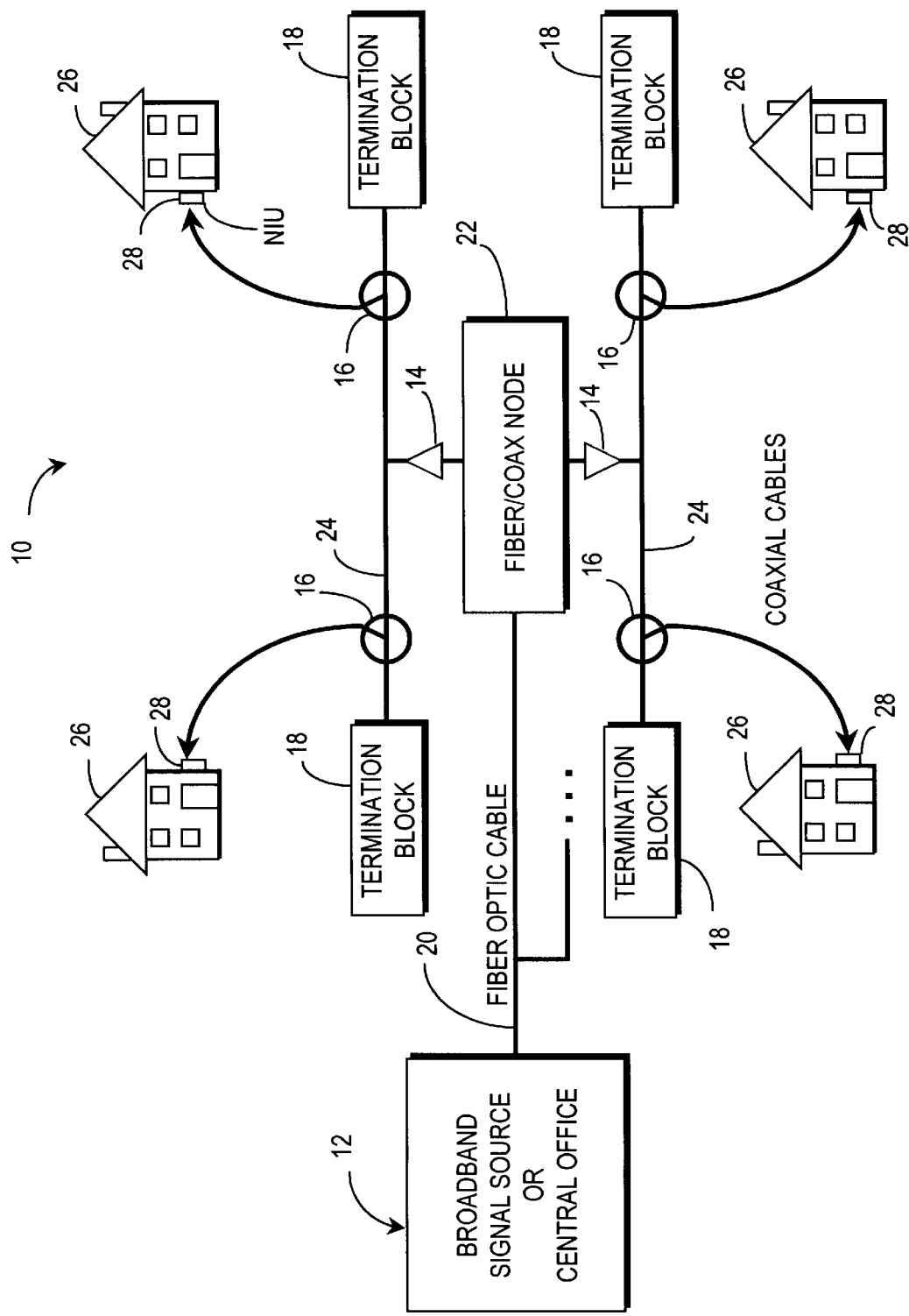
FIG. 1 is a block diagram of a CATV system which delivers power and broadband signals to consumer sites.

FIG. 1 shows a CATV broadband signal system that effectively delivers power to subscriber sites. System 10 includes a broadband signal source 12 which supplies broadband signals, such as video broadcast services, to one or more trunks 20. The broadcast services are transmitted over trunk 20 which may be a fiber optic cable. Each trunk 20 is coupled to one or more fiber/coaxial distribution nodes 22, only one of which is shown for clarity. At node 22, the fiber optic cables are coupled to coaxial cable feeder lines 24 for distribution of the broadband signal and power to consumer sites 26. Each feeder line 24 terminates into a termination block 18. Taps 16 divert a portion of the broadband signals to a consumer site 26. The diverted signals are coupled to a network interface unit (NIU) 28 which controls the signals that may be accessed by a consumer site 26. Amplifiers 14 maintain the broadband signals at an adequate level so subsequent sites 26 can tap the signals. System 10 may also be a communication system such as a telephone utility where the signal source 12 is a central office and the trunk and feed lines carry voice and data.

To deliver electrical power to operate amplifiers 14 and NIUs 28, a power supply 30 (refer to FIG. 4) is preferably provided at nodes 22 to generate a slowly varying AC trapezoidal waveform. Power supply 30 may receive power from an electric utility, and convert said power to a low frequency AC. Delivering power at the low frequency AC reduces electrolysis at the NIU 28. The preferred power output is a low frequency trapezoidal waveform, with a frequency of 1 to 10 Hz, although frequencies of up to approximately 60 Hz may be used. The RMS power delivered by the preferred trapezoidal waveform to amplifiers 16 and NIUs 28 is greater than that typically delivered by sinusoidal AC waveforms at the same peak voltage, thus reducing operating costs for system 10. Power supply 30 may be further supplemented with battery backup and/or a generator, to supply power in the event of a power outage. Thus, the delivery of power from the distribution node 22 is made more reliable.

Figure 2:
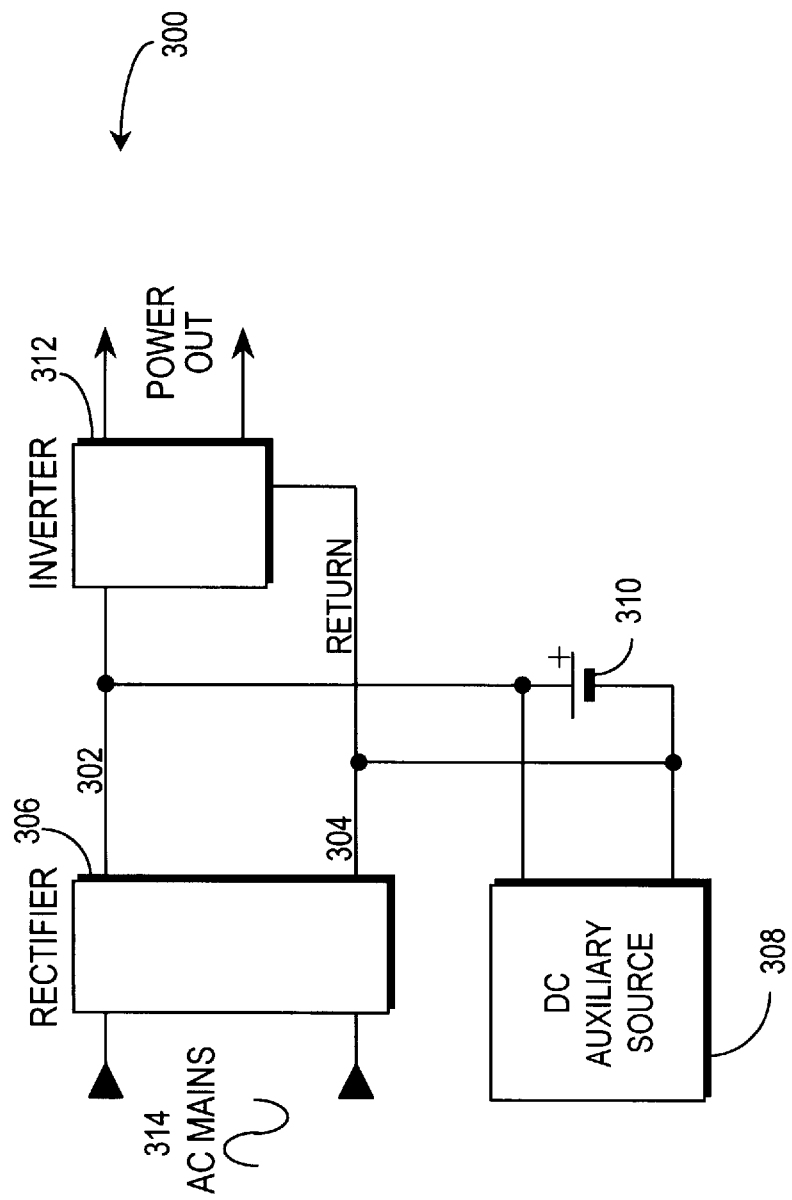
FIG. 2 is a block diagram of the power conversion portion of a prior art power supply used in the CATV system.

FIG. 2 is a block diagram of the power conversion portion 300 of a prior art power supply used in the CATV system. The system has a common power bus 302 and 304 interconnecting the rectifier 306, the DC auxiliary source 308 and the battery 310. Common bus 302 and 304 is connected to the inverter 312. The rectifier 306 converts mains power 314 to DC, which power is transmitted to the inverter 312 for subsequent inversion and conditioning to then supply system power to the subscribers. The power from the rectifier 306 is also used to maintain the charge of the battery 310.

Still referring to FIG. 2, since the system shares a common bus, the battery 310 must be charged using a floating charge regime. Floating charge requires the application of a constant voltage to a storage battery. Said voltage must be sufficient to maintain an approximately constant state of charge while the battery is idle. For adequate battery life, floating charge requires the application of a constant, carefully controlled, ripple free voltage. Though conditioning or smoothing out the output power is usually relegated to the inverter 312, float charging the battery 310 places tight restrictions on the power output from the rectifier 306, thus increasing the price of the rectifier, reducing the life of the battery, or both.

Still referring to FIG. 2, another consequence of the power sharing a common bus is that a short circuit or failure in the DC auxiliary source 308 directly affects the rectifier 306 and inverter 312. Thus, failure of the DC auxiliary source 308 could cause failure of power to the subscribers.

Figure 3:
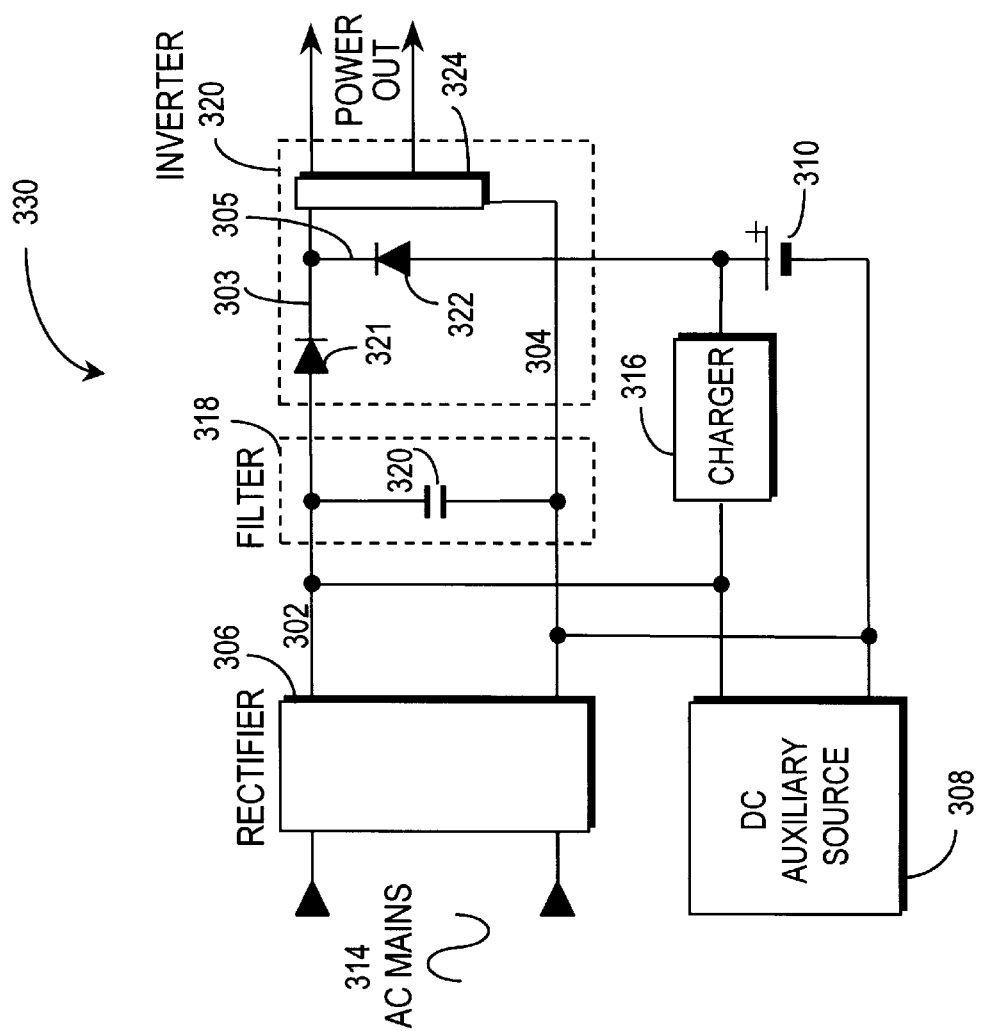
FIG. 3 is a block diagram of the power conversion portion of a preferred embodiment of the power supply used in the CATV system.

FIG. 3 is a block diagram of the power conversion portion 330 of a preferred embodiment of the power supply used in the CATV system. The preferred embodiment system has redundant power bus 302, 303, 304 and 305 interconnecting the rectifier 306, the DC auxiliary source 308, the battery 310 and the inverter 320. The system further comprises a charger 316 and a filter 318. In this case, filter 318 is represented by a capacitor 320, though the filter 318 could be a more complex type of filter, commonly known in the industry. A novel aspect of the preferred embodiment is that the various units comprising the power conversion are diode isolated from each other. Thus, the inverter 320 is shown to consist of an H-bridge and two diodes 321 and 322.

Still referring to FIG. 3, the rectifier 306 converts mains power 314 to DC, which power is transmitted to the inverter 320 for subsequent inversion and system power. However, unlike the prior art power conversion method shown in FIG. 2, here the power from rectifier 306 does not directly charge the battery 310. Instead, battery 310 is charged by power conditioned by the charger 316.

Other significant differences between this preferred embodiment and the prior art are evident by comparing FIGS. 2 and 3. In FIG. 2, a short circuit of the DC auxiliary source 308 would completely disrupt power to the subscribers. By contrast, in FIG. 3, the power from the rectifier 306 and the auxiliary power source are isolated from each other. Thus, a short circuit of the DC auxiliary source 308 would have no adverse impact on the power supplied to the inverter 320, and thus would have no adverse impact on the power supplied to the subscribers.

Still referring to FIG. 3, the isolation of the battery 310 from the rectifier 306 output power dispenses with the need to float charge battery 310, since the battery charging is independent of rectification. This allows the use of various charging regimens which may be more beneficial to the battery and extends its life.

Referring now to FIGS. 2 and 3, even if the CATV operators still wanted to float charge the battery 310, the subject invention results in increased battery life. One of the factors that affects battery life is how frequently the battery power is tapped. In FIG. 2, even a short duration glitch or voltage drop on the AC mains power 314 would cause the battery 310 to have to supply power to the inverter 320. These short duration power glitches, which may occur often, decrease the battery life. The system shown in FIG. 3 allows the battery 310 to be float charged at a voltage level that is lower than the AC mains voltage 314. Note that in FIG. 2, the battery 310 cannot be float charged at a voltage level lower than the rectifier 306 output, since the voltage across the battery is the same as rectifier 306 voltage output.

Referring again to FIG. 3, if there is a short duration voltage drop on the AC mains power, the filter 318 will smooth out the power and continue supplying power to the inverter 320. The battery power will not be tapped unless the voltage output from the filter 318 drops below the battery voltage. This reduces the frequency in which battery 310 is tapped, thereby increasing its life.

Figure 4:
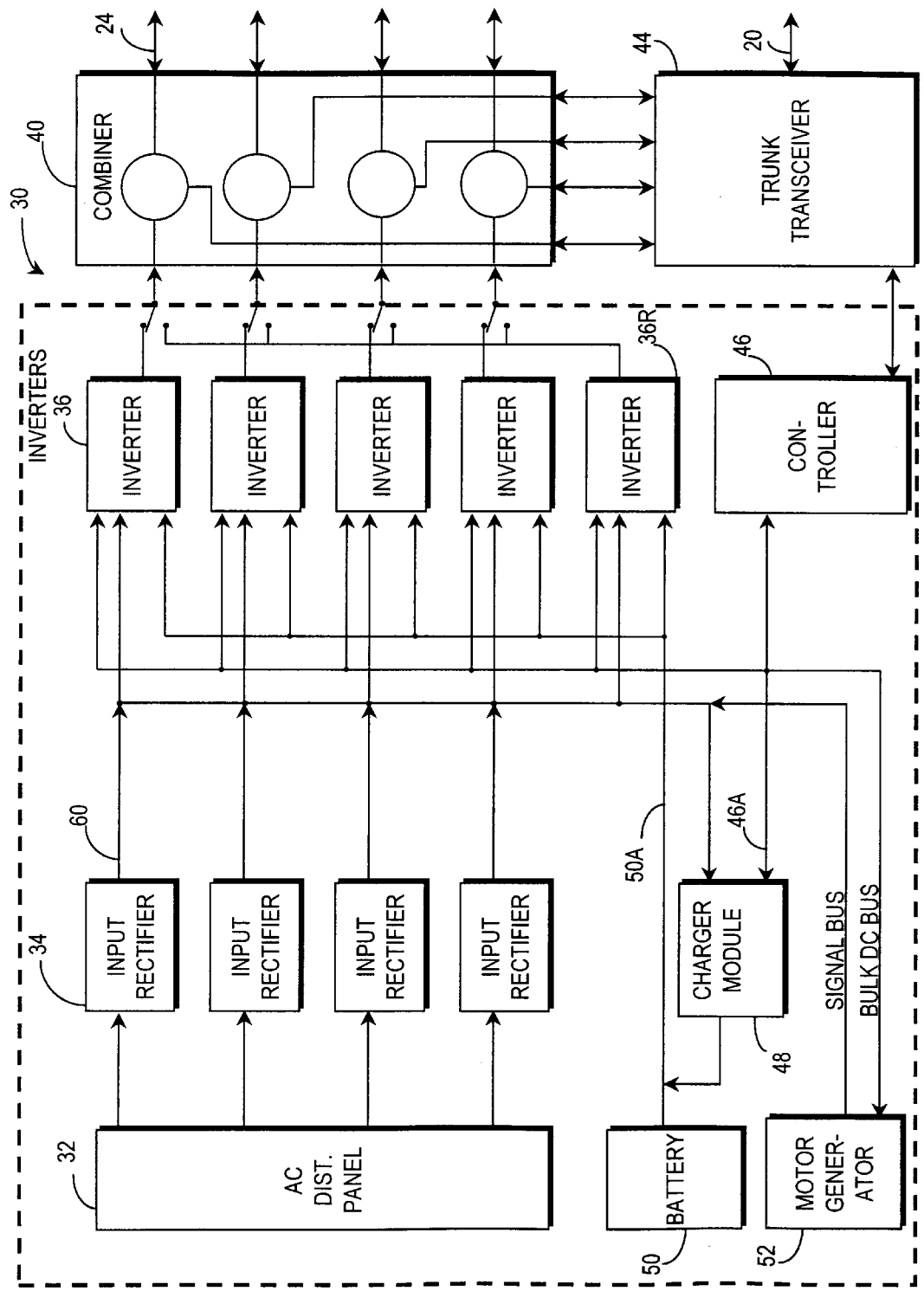
FIG. 4 is a block diagram of a preferred embodiment of the power supply used in the CATV system.

A preferred embodiment of power supply 30 is shown in FIG. 4. Supply 30 includes an AC distribution panel 32, input rectifiers 34, and power inverters 36. A fifth inverter 36R is a redundant inverter to replace one of the other inverters 36 if one becomes defective. AC distribution panel 32 delivers AC power, such as that supplied by electric utilities, to rectifiers 34. Rectifiers 34 convert the AC voltage to DC and supply it to inverters 36 through leads 60. The output of each inverter 36 is coupled through a combiner 40 to coaxial cables 24 to deliver output power.

Combiner 40 also supplies broadband signals received from a trunk transceiver 44 to the coaxial cables 24. Instead of rectified power from rectifiers 34, or as back-up power in case of electric utility power outage, battery 50 may supply DC power to rectifiers 34, battery 50 may be used to provide DC power, instead of the AC power from distribution panel 32. Battery 50 supplies power to inverters 36 through leads 50A. A charger module 48 and motor generator 52 further enhance the reliability of battery. Generator 52 may operate on natural gas, propane, or gasoline. Charger module 48 monitors the battery voltage and activates motor generator 52 if it senses a voltage drop below a predetermined threshold, thus maintaining battery 50 at or near capacity.

Figure 5:
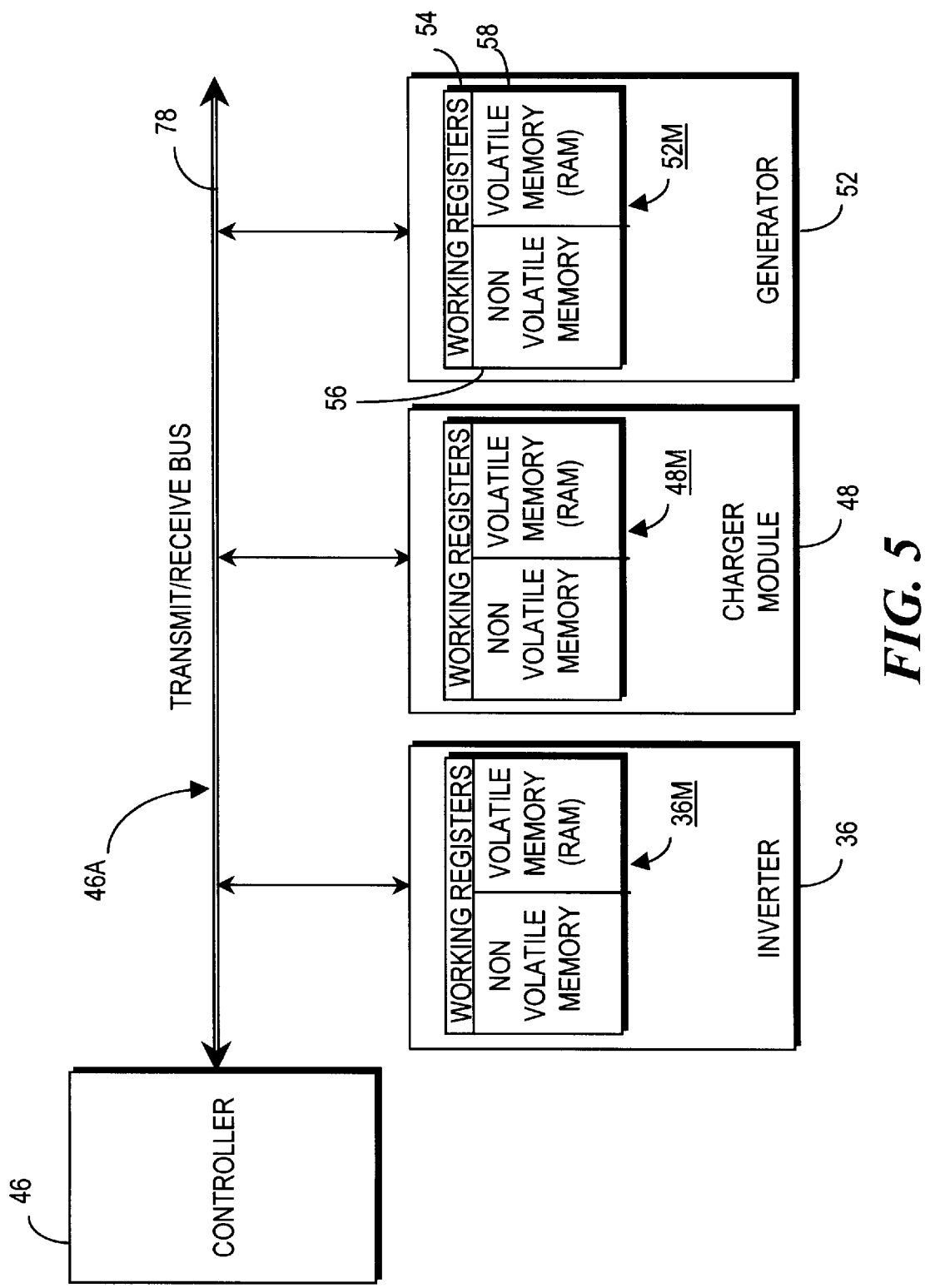
FIG. 5 is a block diagram of the controller interface with the power supply and memory devices.

Referring to FIG. 4 and FIG. 5, controller 46 exchanges control and status information with the inverters 36, charger 48, and generator 52 through bus 78. The communication protocol between controller 46 and devices 36, 48 and 52 is designed to support efficient, low baud rate communication, preferably up to 1200 baud, between the controller 46 and up to preferably sixteen devices, although more may be supported in accordance with the principles of the present invention. In a preferred embodiment of the invention, devices 36, 48, and 52 transmit when polled by controller 46. Alternatively, the communications may be interrupt driven or utilize a token passing protocol. These and equivalent communication schemes are contemplated by the present invention.

Still referring to FIG. 4 and FIG. 5, each device 36, 48, and 52 is logically considered by controller 46 to consist of a memory array, such as 36M, 48M and 52M. Each memory array, such as memory array 52M, is divided into working registers 54, non-volatile storage 56, and volatile storage 58. For controlling a device 36, 48 and 52, controller 46 accesses memory storage 58 through working registers 54. Control data written to working registers 54 is written to volatile storage 58 and echoed back to the controller 46 to enable immediate verification that data was transferred without error. Devices 36, 38 and 52 retrieve the control data from its corresponding memory array 36M, 48M or 52M, execute the control operation indicated by the control data, and acknowledge execution of the control operation by clearing at least one bit of the control data byte stored in memory array 36M, 48M or 52M.

Still referring to FIG. 4 and FIG. 5, controller 46 obtains status information from devices 36, 48, and 52. Each device 36, 48 and 52 writes status data into its corresponding memory array 36M, 48M and 52M. Controller 46 monitors the operation of the power supply 30 through each memory array 36M, 48M and 52M, receives status information from each memory array 36M, 48M and 52M, and feeds back the status information to central office 12 through trunk transceiver 44 and trunk 20. Status data read from volatile storage 58 or non-volatile storage 56 results in the return of two identical data elements to the controller 46 for verifying data integrity.

Referring to FIG. 6, memory arrays 36M, 48M, and 52M are partitioned such that a corresponding device 36, 48, and 52 has an array of preferably byte size registers assigned to store status, control and device specific information. Column 82 represents a hexadecimal address for indexing into an array, column 84 is a general description of an array register, column 86 indicates controller 46 Read/Write access rights to an array register, and column 88 indicates the type of memory storage, volatile 56 or non-volatile 58, used for an array register.

Still referring to FIG. 6, a memory array 36M, 48M and 52M further comprises a communication error register 90, a critical status register 92, a plurality of status registers 94, a plurality of control registers 96, a plurality of parametric measurement registers 98, a plurality of calibration factor registers 100, a plurality of calibrated parametric setting registers 102, and a plurality of uncalibrated parametric setting registers 104. A device 36, 48 and 52 initializes the contents of its error register 90 to zero at power-up. Upon detection of a communication error, device 36, 48 and 52 increment the contents of its corresponding error register 90.

Controller 46 reads critical status register 92, preferably on a timed interval, to detect status changes in a device 36, 48, or 52 without analyzing the status registers 94. When a device 36, 48 or 52 experiences a status change, status data is written into one of the status registers 94. In addition the device 36, 48, or 52 updates critical status register 92 to identify the type of detected status change. Preferably, an update of the critical status register 92 occurs when power supply 30 experiences a loss or reduction in the power supplied to a consumer site 26. In response to a status change, controller 46 modifies operation of a device 36, 38, or 52 by writing control data to a control register 96.

Device 36, 48 and 52 stores parametric measurements, that is, actual output parameters of a device 36, 48 or 52 in registers 98. Parametric measurements are signed 2's complement binary numbers. The controller 46 reads a parametric measurement register 98 and multiplies the measurement by a bit weight to obtain a fixed or floating point value. In a preferred embodiment of the invention, error register 90, critical status register 92, status registers 94, control registers 96 and parametric measurement registers 98 are preferably stored in volatile memory 56.

Nonvolatile memory 58 preferably contains parametric setting registers 102, 104, and calibration registers 100. Parametric settings are unsigned 2's complement binary numbers created by controller 46 to select a desired output of a device 36, 48, 52. Controller 46 divides a fixed or floating number by bit weight, rounds the result, and stores a signed calibration factor corresponding to the parametric readings and settings. Each parametric measurement found in register 98 and each calibrated parametric setting found in register 102 has a corresponding calibration factor. The contents of a calibration register 100 are added to the contents of a corresponding measurement 98, or setting 102 register to create a signed result which corrects for hardware offset errors.

Table 1 illustrates system 10 data useful in monitoring output power to sites 26. Those skilled in the art appreciate that this list is not exhaustive and other types of data may be measured and monitored to control the power output and still achieve similar results.

TABLE I

|  | CHARGER | INVERTER | GENERATOR |
|---|---|---|---|
| Status | de-energized output current limit relay, | inverter electrical malfunction, | natural gas leak, generator failure, |

TABLE I-continued

|  | CHARGER | INVERTER | GENERATOR |
|---|---|---|---|
| Data | de-energized input current limit relay, charger inhibited, charger running in boost mode, manual reset switch selected, real-time status of the manual reset switch, active overvoltage protection circuit, critical heatsink or ambient temperature, fan enabled, input voltage drop below threshold level, discharging battery, disconnected plug, blown fuse, out-of-range setup parameter, rectifier unplugged, visual indicator lamp enabled | inverter output inhibited critical heatsink or ambient temperature, output inhibited due to overcurrent, inverter output inhibited due to run-down battery, output inhibited due to overvoltage error, H-bridge return via positive polarity switch, inverter operating in unipolar mode, time-out while waiting for the SYNC signal time-out while waiting for POS/NEG signal, no measurable load on the inverter output, de-energized input current limit SCRs, disconnected plug, visual indicator lamp enabled | open enclosure door, water in generator cabin, generator running, generator charging error, loss of natural gas pressure, maintenance service required. |
| Control Data | inhibit charger output, enable visual indicator lamp | inhibit inverter output, select unipolar output operation, start inverter in negative polarity, enable visual indicator lamp | start generator, emergency generator shutdown, enter power down mode |
| Parametric Measurements | input capacitor voltage, output capacitor voltage, output current to battery, battery discharge current, heatsink temperature, internal temperature, rectifier output currents, rectifier circuit breaker voltage drop | battery input voltage, H-bridge input voltage, output crest current, output crest voltage, heatsink temperature, internal air temperature | generator starting battery voltage |
| Parametric Settings | output voltage, output current limit, DAC output | peak current limit setting, output crest voltage setting, half-cycle time, output rise time, shutdown threshold, current limit shutdown delay, retry delay, retry count |  |

Figure 7:
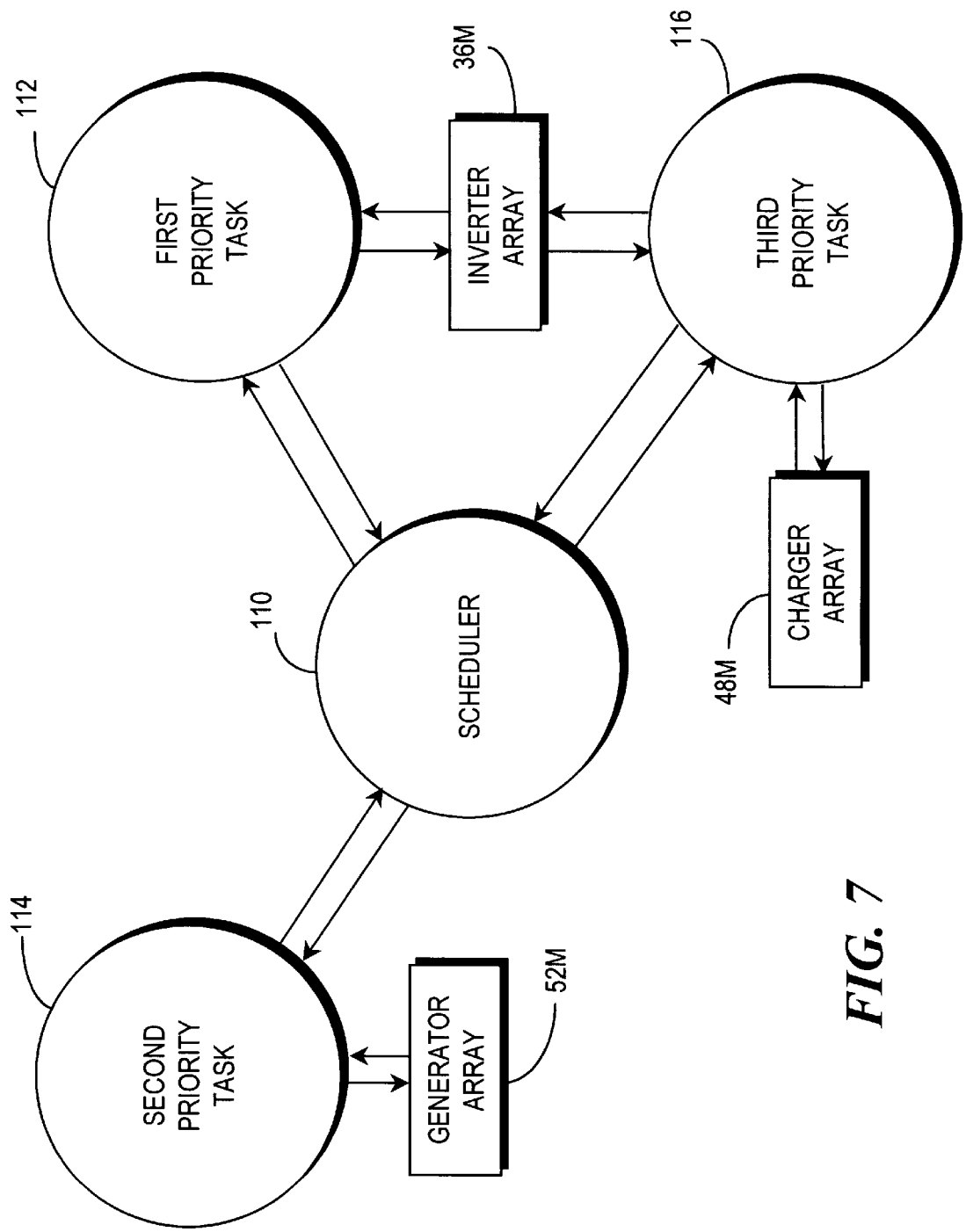
FIG. 7 is a diagram depicting control and data flow for the controller.

Referring to FIG. 7, controller 46 has a scheduler 110 and a plurality of tasks 112, 114, 116 operating in a multi-tasking environment. Scheduler 110 executes each of the plurality of tasks 112, 114 and 116 for maximum utilization of the network bandwidth. Each task 112, 114 and 116 is assigned a priority level and a selected duration of time of the network bandwidth so that the controller 46 may efficiently determine critical changes in power distributed through the CATV system 10. Because maintaining and controlling power output to consumer sites 26 is important in the subject invention, the top priority task 112 continuously monitors critical status register 92 of each active inverter 36M. In the worst case, for a scan of the critical status 92 for each active inverter 36M, scheduler 110 schedules approximately 80% of the network bandwidth. To provide a timely indication of explosive gas levels, the second priority task 114 monitors the critical status register 92 of the generator 52M. In worst case, scheduler 110 schedules approximately 10% of the network bandwidth for monitoring the status of generator 52. For other less time critical functions, such as monitoring the battery charger 48, controlling the battery heater, or executing a power-up sequence, scheduler 110 schedules the remaining network bandwidth.

Figure 8A:
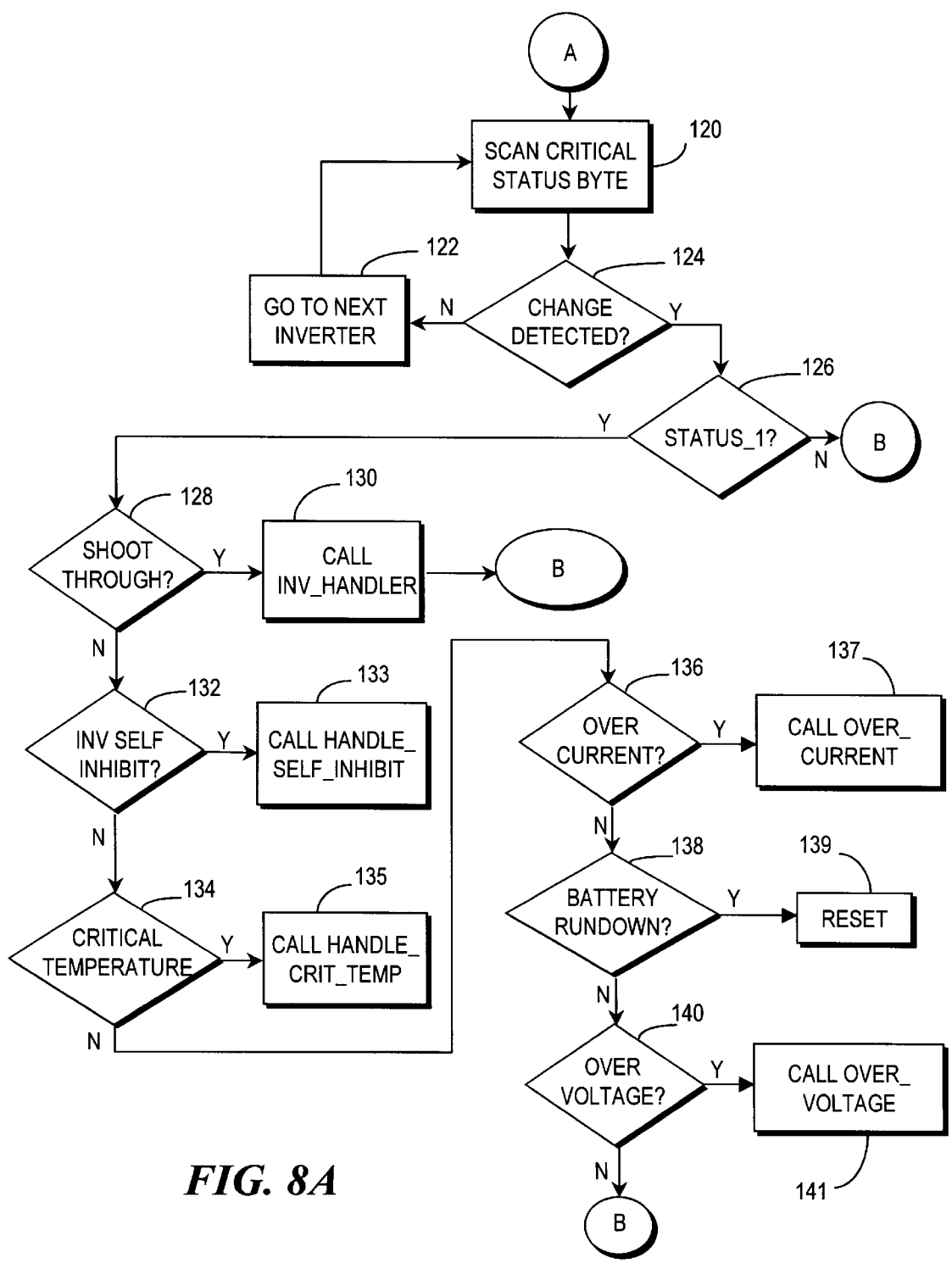
FIG. 8A, 8B and 8C are flow charts for a first priority task.
Figure 8B:
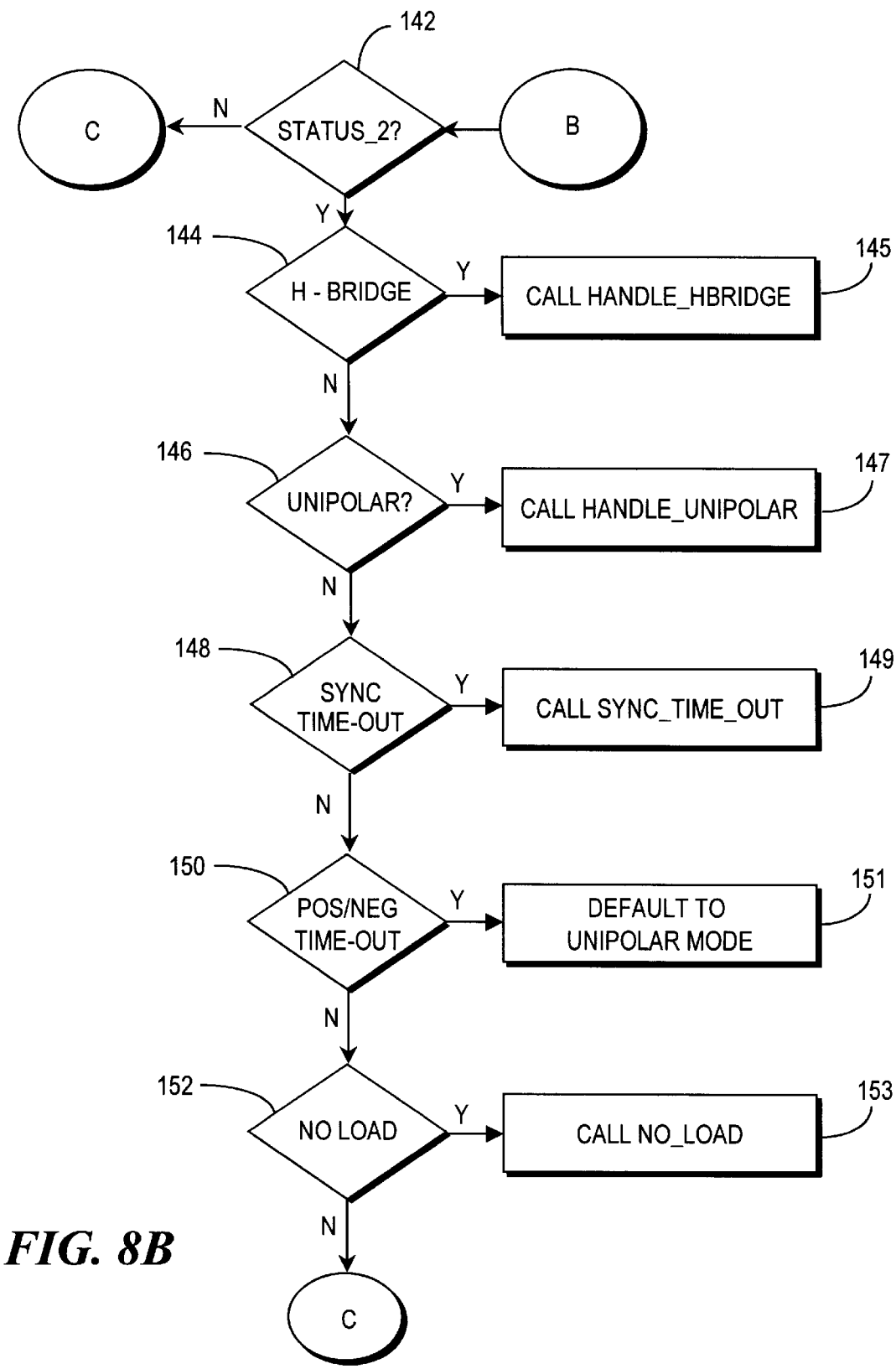
Figure 8C:
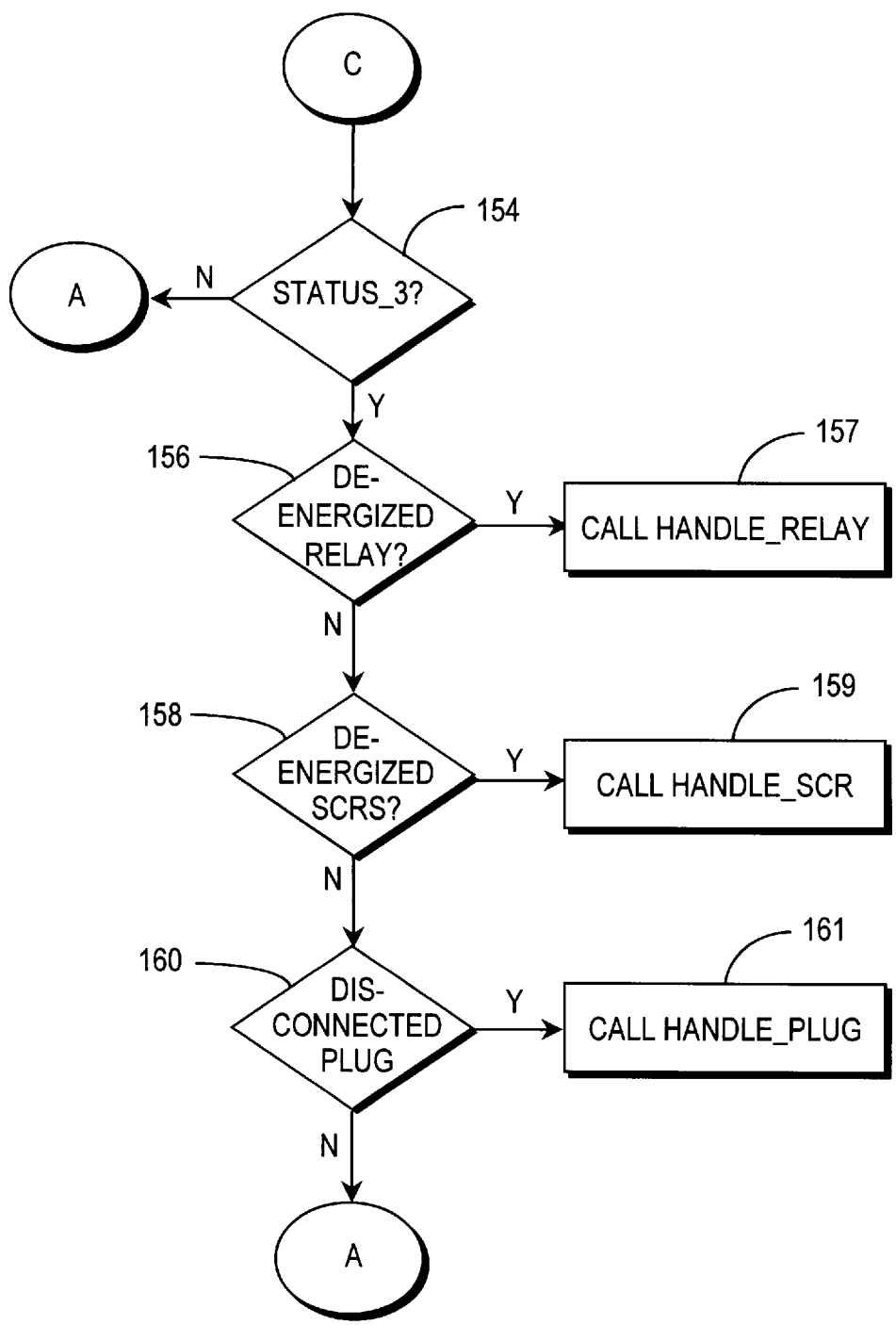

A flow chart for the first priority task 112 executed by controller 46 is shown in FIGS. 8A, 8B, and 8C. Initially, controller 46 scans the contents of the critical status register 92 of an active inverter's memory array 36M for a change in the status of the inverter 36 (Step 120). If a status change is not detected, controller 46 advances to the next active inverter's memory array 36M (Step 122). If a status change is not reported by any active inverter 36, control returns to the scheduler 110. If a status change is detected (Step 124), controller 46 must first interrogate the appropriate status bytes (Steps 126, 142 and 154, in FIGS. 8A, 8B and 8C respectively) and determine if the change is benign; that is, if the change does not require intervention of service by controller 46 (Step 128); or whether the change requires further analysis by controller 46. Changes are considered benign as long as output power, even unipolar power, is being supplied to the loads. Benign changes are handled locally by inverter 36 without requiring further handling by the first priority task 112 (Step 130). Pseudocode for the INV_HANDLER subroutine is shown in Table II.

TABLE II

```
IF (inverter's return switch shorted or improper output polarity switch)
{
  Set SYNCH_TIMEOUT counter;
  Wait for SYNC line high signal;
  IF (SYNCH TIMEOUT>O)
    {valid error; inverter restarts output in unipolar mode;}
  ELSE
    {retry inverter;}
    IF (retry successful)
      {clear STATUS bit;}
    ELSE
      {restart output in unipolar mode;}
      IF (error)
        {inhibit inverter output; }
}
```

Referring to Table II the status data for an inverter 36 may include a signal that an inverter's 36 negative return or positive return switch is shorted or one or more of the inverters attempted to switch output polarities at the wrong time. The inverter 36 then waits for a predetermined period to verify if the SYNC line corresponding to the error polarity goes high. If the SYNC line goes high within a time-out period, a valid error occurred and the inverter will lock itself in the non-errored polarity and attempt to restart the output in unipolar mode.

If, on the other hand, the line stays low for the time-out period, the error was probably set by noise, or one or more of the inverters 36 failed. In this case, a single retry of the same polarity is issued to inverter 36. If the restart is successful then the status is cleared. If the error occurs a second time, the inverter 36 will lock itself in the non-errored polarity and attempt to restart the output in unipolar mode. If the inverter 36 locks itself in the non-errored polarity and attempts to restart the output in unipolar mode and an error results, the inverter 36 will disable its output and wait for intervention by the first priority task 112. If no error occurs, the output will remain in unipolar mode until intervention by the first priority task 112.

Referring to FIG. 8A, if the output of the inverter 36 is self-inhibited (Step 132), controller 46 calls the HANDLE_SELF_INHIBIT subroutine (Step 133). If the status byte 94 indicates that the inverter heatsink or inverter module ambient temperature reaches a critical level (Step 134), controller 46 calls the HANDLE_CRIT_TEMP subroutine (Step 135). If the status byte 94 indicates an over-current condition with the inverter 36 (Step 136), controller 46 calls the OVER_CURRENT subroutine (Step 137). If the status byte 94 indicates a run-down battery and the inverter 36 is in battery mode (Step 138), inverter 36 is enabled by a RESET signal from controller 46 (Step 139). If the status byte 94 indicates an overvoltage condition with the inverter 36 (Step 140), controller 46 calls the OVER_VOLTAGE subroutine (Step 141).

Referring to FIG. 8B, if a status change is detected in the second status byte 94 (Step 142), controller 46 interrogates each bit in the status register 94 to identify the changed condition. If the status byte 94 indicates the H-bridge return is via the positive polarity switch (Step 144), controller calls the HANDLE_HBRIDGE subroutine (Step 145). If the status byte 94 indicates that the inverter 36 is operating in unipolar mode (Step 146), controller 46 calls the HANDLE_UNIPOLAR subroutine (Step 147). If the status byte 94 indicates a time out while the inverter waits for the SYNC line to go high at the end of the output crest (Step 148), controller 46 calls the SYNC_TIME_OUT subroutine (Step 149).

If status byte 94 indicates a time out while the inverter waits for the POS/NEG sync lines to go high (Step 150), inverter 36 defaults to unipolar mode (Step 151). If the status byte 94 indicates there is no measurable load on the inverter 36 output due to a load failure, a redundancy failure, or open output circuit breaker (Step 152), controller 46 calls the NO_LOAD subroutine (Step 153).

Referring to FIG. 8C, if a status change is detected in the third status byte 94 (Step 154), controller 46 interrogates each bit in the status register 94 to identify the changed condition. If the status byte 94 indicates a de-energized relay as the result of an inverter 36 electrical malfunction (Step 156) controller 46 calls the HANDLE_RELAY subroutine (Step 157). If the status byte 94 indicates a de-energized SCR due to the different potentials of the rectifier bulk DC capacitors and the inverter bulk DC filter capacitors (Step 158), controller 46 calls the HANDLE_SCR subroutine (Step 159). If the status byte 94 indicates the inverter plug is disconnected (Step 160), controller 46 calls the HANDLE_PLUG subroutine (Step 161).

Figure 9:
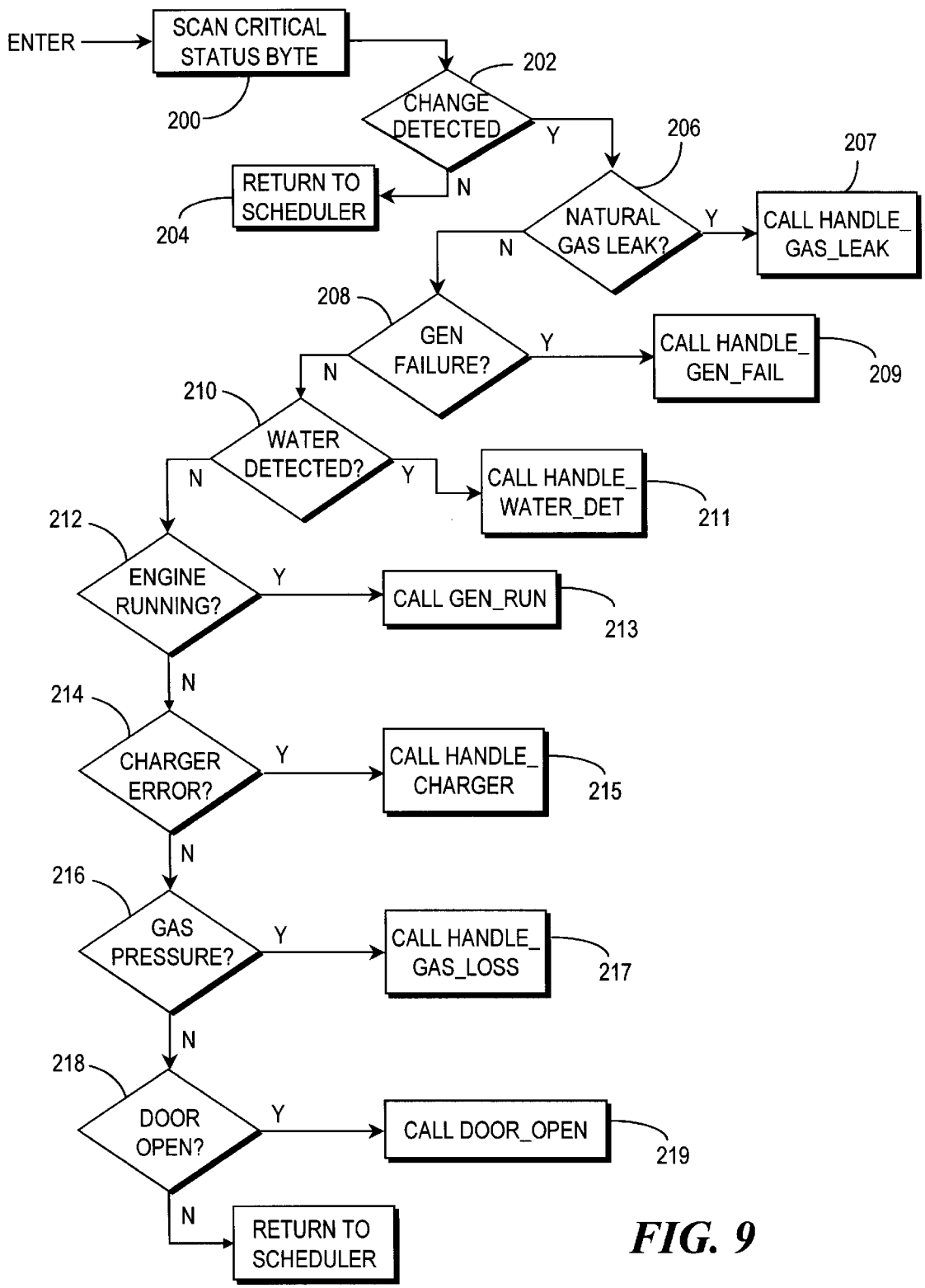
FIG. 9 is a flow chart for a second priority task.

A flow chart for the second priority task 114 executed by controller 46 is shown in FIG. 9. Initially, controller 46 scans the contents of the critical status register 92 (Step 200) of the generators memory array 52M for a change in the status of the generator 52 (Step 202). If a status change is not detected, control returns to the scheduler 110 (Step 204). If a status change is detected (Step 202), controller 46 must first interrogate the status byte and determine if the change is benign; that is, the change does not require intervention or service by controller 46, or whether the change requires further analysis by controller 46. If the status byte 94 indicates a natural gas leak (Step 206) controller 46 calls the HANDLE_GAS_LEAK subroutine (Step 207). If the status byte 94 indicates an abnormal condition that results in a failure of the generator (Step 208), controller 46 calls the HANDLE_GEN_FAIL subroutine (Step 209).

If the status byte 94 indicates that water is detected (Step 210), controller 46 calls the HANDLE_WATER_DET subroutine (Step 211).

If the status byte 94 indicates the generator engine is running (Step 212), controller 46 calls the GEN_RUN subroutine (Step 213). If the status byte 94 indicates a starting battery charger error (Step 214), controller 46 calls the HANDLE_CHARGER subroutine (Step 215). If the status byte 94 indicates a loss of natural gas pressure (Step 216), controller 46 calls the HANDLE_GAS_LOSS subroutine (Step 217). If the status byte 94 indicates an open enclosure door (Step 218), controller 46 calls the DOOR_OPEN subroutine (Step 219).

Figure 10:
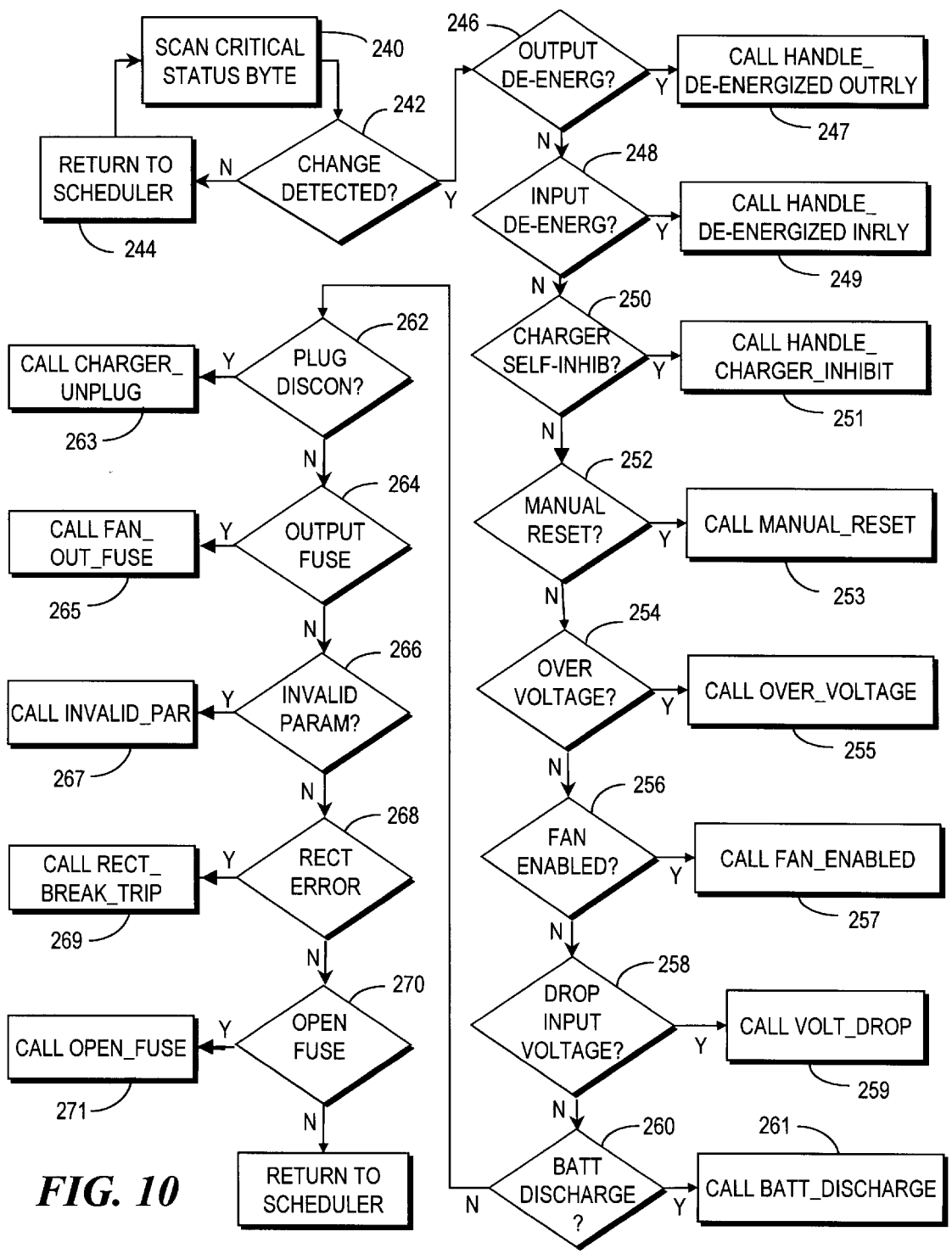
FIG. 10 is a flow chart for a third priority task.

Referring back to FIG. 7, a third priority level task 114 is assigned the least amount of execution time. The scheduler 110 will handle requests for service by a third priority task 114 on a first come, first served basis. A third priority task 114 may include a task which interrogates the battery charger 48 for status changes. A flow chart for such a third priority task 114 executed by controller 46 is shown in FIG. 10. Initially, controller 46 scans the contents of the critical status register 92 (Step 240) of the battery charger's memory array 48M for a change in the status of the battery charger 48 (Step 242). If a status change is not detected, control returns to the scheduler 110 (Step 244). If a status change is detected (Step 242), controller 46 must first interrogate the status byte 94 and determine if the change is benign; that is, the change does not require intervention or service by the controller 46, or whether the change requires further analysis by the controller 46. If the status byte 94 indicates the output current limit relay is de-energized (Step 246), controller 46 calls the HANDLE_DEENERGIZED_OUTRLY subroutine (Step 247). If the input current limit relay is de-energized (Step 248), controller 46 calls the HANDLE_DEENERGIZED_INRLY subroutine (Step 249). If the status byte 94 indicates the battery charger 48 is self-inhibited (Step 250), controller 46 calls the HANDLE_CHARGER_INHIBIT subroutine (Step 251). If the manual reset button is depressed (Step 252), controller 46 calls the MANUAL_RESET subroutine (Step 253). If the overvoltage protection circuit operates (Step 254), controller 46 calls the OVER_VOLTAGE subroutine (Step 255). If the charger enables a fan (Step 256), the controller 46 calls the FAN_ENABLED subroutine (Step 257). If the charger input voltage drops below the threshold value indicating loss of a rectifier, loss of AC utility input, or reduction of AC input (Step 258), controller 46 calls the VOLT_DROP subroutine (Step 259). If the battery is discharging (Step 260), controller 46 calls the BATT_DISCHARGE subroutine (Step 261). If the charger plug is disconnected, (Step 262), controller 46 calls the CHARGER_UNPLUG subroutine (Step 263). If there is a failure of the fan output fuse (Step 264), controller 46 calls the FAN_OUT_FUSE subroutine (Step 265). If the battery charger receives an invalid or out-of-range setup parameter (Step 266), controller 46 calls the INVALID_PAR subroutine (Step 267). If the rectifier circuit breaker is tripped or the rectifier is unplugged (Step 268), controller 46 calls the RECT_BREAK_TRIP subroutine (Step 269). If the status change indicates an open fuse (Step 270), controller 46 calls the OPEN_FUSE subroutine (Step 271).

A third priority task 116 may also include a routine that analyzes the rectifier currents to detect failure of a rectifier or its AC input. Further, a third priority task 116 may include a battery thermal management routine responsible for analysis of battery compartment temperature compared to outdoor air temperature and controlling the battery heaters to maintain a minimum temperature on the battery case. If where the outdoor air is cooler than the battery compartment air and the battery compartment air temperature is higher than a predetermined upper limit, a routine enables the battery compartment ventilation fan. Finally, a third priority task 116 may include a battery charging profile management routine responsible for modifying the battery charger output to optimize battery float levels versus temperature and to implement various charging schemes. While the battery is discharging, this routine accumulates discharging amp-hours. This list is not exhaustive and other routines, including a data reporting and acquisition routine, are contemplated by the subject invention. For each third priority level task 116, a suitable response to status changes would be to update appropriate control data 96 and continue distribution of power through the CATV system 10.

The foregoing description of the preferred embodiment of the present invention has been presented for illustration. It is not intended to be exhaustive or to limit the invention to the precise form disclosed. Obviously, many modifications and variations will be apparent to practitioners skilled in this art. The embodiment was chosen and described to best explain the principles of the invention and its practical application, thereby enabling others skilled in the art to understand the invention for various embodiments and with various modifications as are suited to the particular use contemplated. It is intended that the scope of the invention be defined by the accompanying claims and their equivalents.

I claim:

1. A power-distribution optimized broadband system, comprising:

a plurality of nodes coupled to said broadband system for receiving a broadband signal, each said node comprising a power supply connected to a plurality of power outlets for supplying power to a plurality of distribution lines coupled to said node, and each said node further comprising a combiner for coupling said broadband signal to said power for transmission through said distribution line;

said power supply comprising a plurality of inverters, each having a memory for storing status parameters, and a controller for monitoring said status parameters in each said inverter; and a transmitter for transmitting said status parameters to said broadband system, for said broadband system to maintain a status of said plurality of nodes and to detect an operation error in said broadband system.

2. The system of claim 1 wherein each said memory includes volatile memory for storing a plurality of control parameters and nonvolatile memory for storing a plurality of parametric values representing a desired value for each said status parameters.

3. The system of claim 1 further comprising means for correcting said operation error, for maintaining a continuous supply of power on said plurality of distribution lines.

4. The system of claim 3, wherein each inverter supplies power to one of said distribution lines; and said plurality of status parameters further comprises an inverter status for each of said inverters for detecting a reduction in power supplied by each said inverter.

5. The system of claim 4, wherein said power supply further comprises a redundant inverter for replacing one of said plurality of inverters if said inverter status indicates an inoperable inverter.

6. The system of claim 1 wherein said power supply further comprises a charger, and a motor generator, each having a memory for storing status parameters, and wherein said controller monitors said status parameters in each said inverter, charger, and motor generator.

7. The system of claim 1 wherein each controller includes a scheduler that executes a plurality of tasks according to a priority level assigned to each task.

8. The system of claim 7 wherein the highest priority task of each scheduler is monitoring a critical status register in the memory of each inverter.

9. The system of claim 1 wherein said power supplied by said power supplied to said distribution line is a low frequency AC trapezoidal waveform.

10. A method for optimizing power distributed in a broadband system, the broadband system including a plurality of nodes coupled for receipt of a broadband signal, the nodes each comprising a power supply having a plurality of power outlets to supply power to a plurality of distribution lines coupled to the nodes, and a combiner for coupling the broadband signal to the power outlets, said method comprising the steps of:

establishing a plurality of status parameters critical to the optimization of power distribution in the broadband system;

categorizing said status parameters into a plurality of tasks, each said task of different priority;

monitoring said status parameters of each said task in the nodes, according to said tasks' priority level;

detecting a critical change in said status parameters, said critical change indicating a problem in the power supplied to at least one of the distribution lines;

identifying a source of said critical change; and modifying an operating parameter of said source to correct said problem in the power supplied to the distribution line.

11. The method of claim 10, further comprising the steps of:

inhibiting power supplied to the distribution line if said operating parameter modification at said critical change source did not correct said problem in the power supplied to the distribution line; and notifying the broadband system that the distribution line's power has been inhibited.

12. The method of claim 10, further comprising the steps of assigning top priority to said status parameters critical in maintaining and controlling power output and status parameters indicative of dangerous conditions.

13. The method of claim 12, further comprising the steps of:

detecting a benign change in said status parameters, wherein said benign change indicates that output power is maintained, even if said output power has suffered non-critical degradation; and performing an error check for validating said benign change.

14. The method of claim 13, further comprising the step of supplying unipolar power to said distribution line, in response to said detected benign change being indicated by said status parameters.

15. A method for optimizing power distributed in a broadband system comprising a power supply having a plurality of power outlets to supply power to a plurality of distributions lines, a plurality of inverters each having a memory for storing status parameters and a controller for monitoring said status parameters in said inverter, wherein each controller includes a scheduler that executes a plurality of tasks according to a priority level assigned to each task, said broadband system including a combiner for coupling a broadband signal to the power outlets said method comprising the steps of:

storing status parameters in the memory of each respective inverter;

monitoring said status parameters according to the task priority level assigned by the scheduler;

detecting a change in said status parameters; and storing control data in the memory of appropriate inverters responsive to said detected change.

16. The method of claim 15 wherein the step of storing control data in the memory comprises the steps of:

writing said control data to a working register in the memory;

sending an acknowledgment data element to the controller;

verifying that said acknowledgment data and said control data are identical; and writing said control data to a device register in the memory.

17. The method of claim 15 wherein the step of detecting a change in said status parameters comprises the steps of:

reading a current content of a status register in the memory;

transmitting said current content to the controller;

verifying said current content received by the controller is identical to said current content of the status register;

comparing said current content with a previous content; and indicating a status change.

18. The method of claim 15 wherein said step of storing said status parameters in each memory is performed by each respective inverter.

19. The method of claim 15 wherein said step of executing the task of monitoring said status parameters is performed by the controller.

20. A power supply for a power-distribution optimized broadband system, said power supply comprising:

a rectifier comprising an input for receiving AC power, rectifying means for rectifying said input AC power, and an output for supplying said rectified power, said output comprising a positive terminal and a negative terminal;

a back-up battery for providing power in case of failure of the rectifier or in case of failure of AC input power; said back-up battery comprising a positive terminal and a negative terminal;

an inverter comprising an input, said input comprising a positive terminal and a negative terminal, said inverter further comprising circuitry for the inversion of a signal supplied to the inverter input, said inversion circuitry comprising a positive terminal and a negative terminal, said inverter including a memory for storing status parameters, said inverter also comprising a power output to supply power to the optimized broadband system; and a DC auxiliary power source having a DC output for providing auxiliary power to the inverter in case of failure of the rectifier or in case of failure of AC input power, and for charging said back-up battery, said output of said DC auxiliary power source comprising a positive terminal and a negative terminal;

a first power bus interconnecting the positive terminals of said rectifier output, said inverter's input, said DC auxiliary source output and said back-up battery; and a second power bus interconnecting the negative terminals of said rectifier output, said inverter's input, said DC auxiliary source output and said back-up battery; and said inverter further comprising at least one diode for isolating the output of said rectifier from the output of said back-up battery such that said back-up battery is charged independently of said rectifier.

21. The power supply of claim 20 further comprising:

a charger connected to said back-up battery for receiving power from said DC auxiliary power source to charge the back-up battery; and a filter connected to the input and output terminals of said rectifier for filtering the power output flowing from said rectifier to said inverter;

wherein the battery is charged by the charger independent of the power output from said rectifier, and the battery power is not applied to the inverter unless the filter voltage output is less than the battery voltage.

22. The power supply of claim 20 further comprising a controller for monitoring said status parameters in said inverter, wherein each controller includes a scheduler that executes a plurality of tasks according to a priority level assigned to each task.

23. A power supply for a power-distribution optimized broadband system, said power supply comprising:

a rectifier comprising an input for receiving AC power, rectifying means for rectifying said input AC power, and an output for supplying said rectified power, said output comprising a positive terminal and a negative terminal;

a back-up battery for providing power in case of failure of the rectifier or in case of failure of AC input power, said battery comprising a positive terminal and a negative terminal;

an inverter comprising an input, inversion circuitry comprising a positive terminal and a negative terminal an input, said inverter input further comprising a first positive terminal, a second positive terminal and a negative terminal, said first positive terminal and said second positive terminal of said inverter's input functionally connected to said positive terminal of said inversion circuitry, and said negative terminal or said inverter's input functionally connected to said negative terminal of said inversion circuitry, said inverter also comprising a power output to supply power to the optimized broadband system; and said inverter further comprising a first diode having an anode and a cathode, said first diode's anode connected to the first positive input terminal of said inverter and said first diode's cathode connected to the positive terminal of said inversion circuitry; and said inverter further comprising a second diode having an anode and a cathode, said second diode's anode connected to the second positive input terminal of said inverter and said second diode's cathode connected to the positive terminal of said inversion circuitry; and a DC auxiliary power source having a DC output for providing auxiliary power to the inverter in case of failure of the rectifier, or failure of AC input power; and for charging said back-up battery; said output of said DC auxiliary power source comprising a positive terminal and a negative terminal;

a first power bus comprising a first, second and third conductors, said first conductor connecting said positive terminal of said rectifier output to said first positive terminal of said inverter, said second conductor connecting the positive terminals of said DC auxiliary source output and the positive terminal of said back-up battery to said second positive terminal of said inverter, and said third conductor connecting the positive terminal of said DC auxiliary source output to the positive terminal of said rectifier output; and a second power bus comprising a first, second and third conductors, said first conductor connecting said negative terminal of said rectifier output to said negative terminal of said inverter, said second conductor connecting the negative terminal of said DC auxiliary source output to said negative terminal of said back-up, and said third conductor connecting said negative terminal of said DC auxiliary source output to the negative terminal of said rectifier output; and wherein, the diode isolation of the output of said rectifier from the output of said DC auxiliary power source allows the continued supply of power to the inverter even in case of failure or servicing of said rectifier, or failure or servicing of said DC auxiliary power source.

24. A power supply as recited in claim 23, said power supply further comprising a charger having a first and a second terminal, said charger's first terminal functionally connected to the positive output terminal of said DC auxiliary source or to the positive output terminal of said rectifier and said charger's second terminal being functionally connected to the back-up battery, said charger for receiving power from said rectifier or receiving power from said DC auxiliary power source, conditioning said received power and using said power to charge the back-up battery.

25. A power supply as recited in claim 24, said power supply further comprising a filter connected to the input and output terminals of said rectifier, said filter for filtering the power output flowing from said rectifier to said inverter.

26. A power supply as recited in claim 23, said power supply further comprising a filter connected to the input and output terminals of said rectifier, said filter for filtering the power output flowing from said rectifier to said inverter.

27. A power supply for use in a node of a broadband communications system, said node receiving a broadband signal and said power supply having a plurality of power outlets to supply power to a plurality of distribution lines coupled to said node, said node having a combiner for coupling said broadband signal to each distribution line, said power supply comprising:

means for establishing a plurality of status parameters associated with power distribution;

means for categorizing said status parameters into a plurality of tasks, each said task having a different priority;

means for monitoring said status parameters of each said task in said node according to said task's priority level;

means for detecting a critical change in said status parameters, said critical change indicating a problem in said power supplied to at least one of said distribution lines;

means for identifying a source of said critical change;

means for modifying an operating parameter of said source to correct said problem in said power supplied to said distribution line; and means for transmitting said status parameters to said broadband system.

28. The system of claim 27 wherein said power supplied by said power supplied to said distribution line is a low frequency AC trapezoidal waveform.

29. The power supply of claim 27 further comprising:

means for inhibiting power supplied to said distribution line if said operating parameter modification at said critical change source did not correct said problem in the power supplied to said distribution line; and means for notifying said broadband system that said distribution line's power has been inhibited.

30. The power supply of claim 27 further comprising means for assigning top priority to said status parameters critical in maintaining and controlling power output and status parameters indicative of dangerous conditions.

31. The power supply of claim 30 further comprising:

means for detecting a benign change in said status parameters, wherein said benign change indicates that output power is maintained, even if said output power has suffered non-critical degradation; and means for performing an error check for validating said benign change.

32. The power supply of claim 31 further comprising means for supplying unipolar power to said distribution line in response to said detected benign change indicated by said status parameters.

* * * * *